US005098873A

United States Patent [19]

Edwards et al.

[11] Patent Number: 5,098,873
[45] Date of Patent: Mar. 24, 1992

[54] LOW CEMENT REFRACTORY

[75] Inventors: Leslie C. Edwards, Watsonia; Paul J. Chiron, Box Hill North; Raymond W. Shaw, North Balwyn, all of Australia

[73] Assignee: Comalco Aluminum Limited, Melbourne, Australia

[21] Appl. No.: 663,921

[22] PCT Filed: Oct. 5, 1989

[86] PCT No.: PCT/AU89/00436
§ 371 Date: Mar. 11, 1991
§ 102(e) Date: Mar. 11, 1991

[87] PCT Pub. No.: WO90/03957
PCT Pub. Date: Apr. 19, 1990

[30] Foreign Application Priority Data

Oct. 5, 1988 [AU] Australia ............... PJ 0780

[51] Int. Cl.$^5$ .............................. C04B 35/10
[52] U.S. Cl. ......................... 501/128; 106/692; 106/694; 106/816; 106/817
[58] Field of Search ............... 501/127, 128; 106/692, 106/694, 738, 816, 817

[56] References Cited

U.S. PATENT DOCUMENTS

| | | | |
|---|---|---|---|
| 4,522,926 | 6/1985 | Felice | 501/127 |
| 4,568,652 | 2/1986 | Petty, Jr. | 501/127 |
| 4,943,544 | 7/1990 | McGarry et al. | 501/124 |

Primary Examiner—William R. Dixon, Jr.
Assistant Examiner—Chris Gallo
Attorney, Agent, or Firm—Armstrong, Nikaido, Marmelstein, Kubovcik & Murray

[57] ABSTRACT

A low cement castable refractory comprising 85 to 96% by weight of a calcined ultrafine bauxite aggregate characterized by a particle size of less than 10 um, 2 to 10% by weight of a suitable cement material, 0 to 8% of weight of a thixotropic agent and 0 to 2% by weight of suitable deflocculants and plasticizers, the cement material comprising calcium aluminate cement having an alumina content of 40 to 85% and the thixotropic agents being selected from those containing microfine silica, and/or reactive alumina, the inorganic deflocculants and plasticizers being selected from alkali phosphates, lignosulphonates or naphthalene sulphonates. A method of making a low cement castable refractory and installing a low cement castable refractory are also described.

8 Claims, No Drawings

LOW CEMENT REFRACTORY

FIELD OF THE INVENTION

This invention relates to a low cement castable refractory and to a process for making the same.

BACKGROUND OF THE INVENTION

A number of low cement castable refractories have been developed for use within the aluminum industry. These castable refractories consist of a blend of calcined aggregate, cements and fillers which are mixed in various proportions to suit the specific end applications. The calcined aggregate is selected from a range of materials, including tabular alumina, bauxites, kaolins and other clays, and normally contributes up to 95 wt % of the final refractory mixture.

Characteristics and properties of low cement castables compared with conventional castable refractory materials include:

(i) A low moisture requirement during mixing. This results in a fired refractory of higher density and lower porosity.

(ii) Higher cured and fired strengths, particularly in the temperature range of 600° to 1100° C.

(iii) Greater chemical and erosion resistance against molten metals and slags.

(iv) Higher refractories and greater thermal shock resistance.

Even though superior to conventional castables, a major disadvantage of the low cement castables currently available is their susceptibility to chemical attack and erosion. This necessitates a relatively frequent furnace or crucible shutdown/replacement program and hence reduced productivity. Where used as a barrier layer in reduction cells, a gradual breakdown of the refractory over time leads to exposure of the underlying insulation layers to the aggressive cell environment. Ultimately this will result in cell failure and shutdown, but prior to this a gradual increase in cell voltage and hence a resulting loss in energy efficiency.

A further disadvantage of low cement castables presently available is their high cost compared with conventional castable refractories. This is largely an artifact of the aggregate material; premium grade calcined minerals have been used exclusively for these applications.

SUMMARY OF THE INVENTION AND OBJECTS

There is clearly a need for a low cost, chemically resistant low cement castable refractory for use in the aluminium industry and it is an object of the present invention to provide such a castable refractory and a method of providing same.

The invention provides a low cement castable refractory comprising 85 to 96% by weight of a calcined ultrafine bauxite aggregate in which the ultrafine bauxite forming the aggregate is characterised by agglomerated particles of a size of less than 6 um, 2 to 10% by weight of a suitable cement material, 0 to 8% by weight of thixotropic agent and 0 to 2% by weight of suitable deflocculants and plasticizers.

The calcined ultrafine bauxite aggregate is preferably characterised by a particle size of less than 1 um, such as the naturally occurring "ultrafine" bauxite which occurs at specific bauxite deposits, for example, at the Weipa deposit in Northern Australia. Such ultrafine bauxite is usually recovered from settling and drying ponds in the form of large agglomerated lumps. The lumps are crushed to produce aggregate particles in a range of sizes which are then calcined at high temperatures to produce the calcined ultrafine bauxite aggregate. The calcined aggregate is screened and ground to produce a controlled distribution of sized fractions, the following example of which has been found to provide suitable results in the low cement castable described in this invention:

3 to 6 mm—10 to 40%
1 to 3 mm—5 to 30%
0.1 to 1 mm—5 to 30%
<0.1 mm—10 to 40%

The calcined ultrafine bauxite aggregate differs from conventional calcined refractory grade bauxite aggregates in that it is produced by calcining agglomerated ultrafine bauxite particles. Conventional calcined refractory grade bauxite aggregates are produced by crushing and calcining bauxite ores recovered from the ground in an as-mined form.

The advantage of the calcined ultrafine bauxite aggregate lies in its high microstructural uniformity and low chemical reactivity. Such uniformity cannot be achieved in conventional calcined refractory grade bauxite aggregates because of the inherent inhomogeneities found in the bauxite ores.

Of course acceptable results may be achieved through the communication and re-agglomeration of refractory grade bauxite ores and although this would be a more expensive processing option the resulting castable refractory would nevertheless still offer functional advantages over the currently known low cement castables.

The cement material may comprise calcium aluminate cement, which preferably has an alumina content of 40 to 85%.

The thixotropic agents preferably contain microfine silica and/or reactive alumina. The deflocculants and plasticizers preferably contain alkali phosphates, ligno-sulphonates and napthalene sulphonates.

The new type of refractory has many uses, but is particularly suited in areas where resistance to molten aluminium and/or cryolite ($Na_3AlF_6$) is required, for example, as a refractory for lining aluminium holding furnaces or for the construction of Hall Heroult reduction cells. In the latter case, the new refractory is intended to serve as a barrier or protection layer between the carbonaceious cathode and the underlying insulation.

The refractory material according to the invention has significant advantages over conventional materials presently used for these applications; particularly its extreme chemical resistance to the aggressive molten aluminium and cryolite environment. Part of this chemical resistance can be attributed to the selection and characteristics of the refractory aggregate; in our invention a calcined ultrafine bauxitic based material.

The invention further provides a method of making a low cement castable refractory comprising mixing together 85 to 96% by weight of a calcined ultrafine bauxite aggregate in which the ultrafine bauxite forming the aggregate comprises agglomerated particles having a size less than 6 um, 2 to 10% by weight of a suitable cement, 0 to 8% by weight of a thixotropic agent, and 0 to 2% by weight of suitable deflocculants and plasticizers.

The invention also provides a method of installing a low cement refractory comprising mixing together 85 to 96% by weight of a calcined ultrafine bauxite aggregate comprising agglomerated particles having a size of less than 6 um, 2 to 10% by weight of a suitable cement, 0 to 8% by weight of thixotropic agents and 0 to 2% by weight of suitable deflocculants and plasticizers with 2 to 10% by weight of water, followed by treatment to remove entrapped air, curing and heating to the refractory operating temperature.

In a preferred form of the invention, the ultrafine bauxite is preferably a naturally occurring "ultrafine" bauxite which is derived from the beneficiation of bauxite ore. The ultrafine bauxite material is preferably agglomerated, solar dried to a moisture content of the order of 0 to 10%, recovered, crushed and screened into acicular chips of the desired granulometry and calcined at a temperature above 1350° C. The calcined ultrafine bauxite aggregate is preferably sized and ground to give a distribution in the range of:
3 to 6 mm—10 to 40%
1 to 3 mm—5 to 30%
0.1 to 1 mm—5 to 30%
<0.1 mm—10 to 40%

DESCRIPTION OF THE PREFERRED EMBODIMENT

One technique for producing a low cement castable refractory embodying the invention involves the following steps:

(i) Beneficiation of the bauxite ore to recover an agglomerated ultrafine fraction.

(ii) Solar drying of the ultrafine bauxite material to a desired moisture content (c.a. 0 to 10%).

(iii) Mining of the solar dried ultrafine material. The ultrafine form lumps of agglomerated cake.

(iv) Crushing and screening of the agglomerated ultrafine material, into acicular chips of a desired granulometry (nominally less than 10 mm).

(v) Calcination of the ultrafine chips, at temperatures above 1350° C. The optimum calcination temperature will depend on the chemical composition of the ultrafine bauxite.

(vi) Dry mixing of the calcined aggregate and other constitutents of the refractory to a desired composition.

The resulting castable mixture is then mixed with water, cured and fired to produce the final refractory material.

The first step in the preparation of the castable as described above involves the preparation of the calcined ultrafine bauxite aggregate material. Where naturally occurring, the ultrafine material must be separated from the remainder of the deposit through beneficiation. This is best achieved through a water washing and screening process. The ultrafine material would then be pumped to a tailings dam for settling and solar drying. As an optional stage, the ultrafine slurry may first be classified to ensure that all particles greater than 10 microns in diameter are removed.

During the solar drying process the ultrafines form a cake containing around 0 to 10% moisture. This cake is then mined and crushed to an optimum aggregate size distribution. The aggregate is then calcined at temperatures above 1350° C. Suitable calcination devices include, but are not restricted to, rotary kilns, fluidized beds and gas suspension calciners.

The refractory castable is produced in the following manner. Refractory ultrafine bauxite aggregate is sized to give a distribution in the following range:
3 to 6 mm—10 to 40%
1 to 3 mm—5 to 30%
0.1 to 1 mm—5 to 30%
<0.1 mm—10 to 40%

85 to 96% by weight of this aggregate is dry mixed with 2 to 10% by weight of calcium aluminate cement, 0 to 8% by weight of a thixoptropic agent and 0 to 2% by weight of a suitable defloculant and plasticizer. The calcium aluminate cement can be any commercially available product with an alumina content ranging from 40 to 85%. The thixotropic agent may be any commercially available product or products containing microfine silica and/or reactive alumina. The deflocculant and plasticizer may be any commercially available alkali phosphate or polyphosphate, lignosulphate or napthalene sulphonate.

The calcium aluminate cement and chemical bonding and thixotropic agent are pre-mixed in a suitable powder mixing unit, for example in a V-type mixer. Mixing is carried out until a homogenous powder is obtained. The pre-mixed components are then mixed with the aggregate fractions in a tumble or ribbon type mixer. The dry mix is stored in air-tight bags until ready for casting.

The castable is installed by mixing the dry castable with about 2 to 10% by weight of clean water and a high shear refractory concrete mixer is used to achieve mixing. Mixing is carried out until all particles are uniformly wetted. The castable is placed in position and vibrated with internal poker vibrations or external surface vibrations. A vibration frequency of 3000-18000 vibrations per minute is recommended.

The castable composition is air cured for 24 hours before heating. The heating rate must be slow enough to allow moisture to escape without mechanical damage. Heating or firing is continued until the operating temperature has been reached.

SPECIFIC EXAMPLE

Calcined ultrafine bauxite aggregate was produced with ultrafine bauxite selectively mined from the Weipa beneficiation plant tailings dam. The dried lumps were crushed in a jaw crusher and calcined in an oil fired rotary kiln at a temperature of 1400° to 1450° C. The fine fraction (−250 microns) was produced by wet grinding the coarser aggregate (3 to 5 mm) in a ceramic lined ball mill with ceramic grinding balls.

The chemical compositions of the calcined ultrafine bauxite aggregate is given below:

| Species | Analysis (wt %) |
| --- | --- |
| $Al_2O_3$ | 72.6 |
| $SiO_2$ | 13.8 |
| $Fe_2O_3$ | 8.95 |
| $TiO_2$ | 3.94 |
| $Na_2O$ | 0.06 |
| $K_2O$ | 0.03 |

The calcined ultrafine bauxite aggregate was sized to the following distribution for the castable composition:
3.2 to 5.6 mm—32%
1.0 to 3.2 mm—23%
0.1 to 1.0 mm—21%
<0.1 mm—24%

The sized ultrafine aggregate was then blended with other constitutuents in a laboratory V-mixer, in the following proportions:

| Species | Weight |
| --- | --- |
| Calcined ultrafine bauxite aggregate | 90.4 |
| Calcium aluminate cement (70% Al$_2$O$_3$) | 4.6 |
| Microfine silica | 3.75 |
| Reactive alumina | 1.0 |
| Sodium polyphosphate | 0.25 |

The dry castable mix was then placed in a Hobart mixer and 5% by weight of water was added. Mixing was carried out until a ball in hand test indicated the material was ready for casting. The wet mix was cast in 75 mm cubic blocks using a vibrating table operating at 11000 vibrations per minute. The blocks were left in the moulds at room temperature for 24 hours. They were dried at 100° C. for 24 hours and then heated to 400° C. at 50° C./hour. They were held at 400° C. for 3 hours and fired to 1000° C. at 100° C./hour. They were held at 1000° C. for 2 hours and cooled down in the furnance.

The blocks were tested for density, porosity and cold crushing strength according to ASTM and British Standards. The results are given below:

| | Experimental Result |
| --- | --- |
| Density (gcm$^{-3}$) | 2.8 |
| Porosity (%) | 15 |
| Cold Crushing Strength (MPa) | 85 |

In order to determine the chemical resistance of the cast samples, 28 mm diameter holes were drilled in the fired blocks to a depth of 35 mm. Molten aluminium and cryolite cup tests were carried out with 7075 aluminium alloy and crylolite bath of the following composition:
NaF—53.9%
AlF$_3$—29.4
CaF$_2$—9.8
Al$_2$O$_3$—4.9
Al powder—2.0

The cryolite cup tests were carried out at 1000° C. for 24 hours and the aluminium cup tests at 1000° C. for 72 hours. After cooling, the samples were sectioned and the extent of attack on the refractory observed.

Comparative tests on a commercially available low cement castable refractory with a similar alumina content showed that the extent of attack by cryolite is far less severe in the case of with the castable composition according to the present invention. In the case of three commercial low cement refractories the observed corroded areas were 3.1 cm$^2$, 3.6 cm$^2$ and 2.5 cm$^2$, whereas the corroded area in a refractory according to the invention was 0.9 cm$^2$, representing a significant improvement.

In the case of the aluminium cup tests, the commercially available low cement refractories were characterised by large black/grey areas of corrundum indicating attack and penetration by the molten aluminium of the refractory body. The refractory embodying the invention exhibited no wetting by the aluminium and no reaction, again indicating a significant improvement.

The contents of the provisional specification accompanying Australian Patent Application No. PJ 0780 is incorporated here by cross reference.

We claim:

1. A low cement castable refractory comprising 85 to 96% by weight of a calcined ultrafine bauxite aggregate in which the ultrafine bauxite forming the aggregate is characterised by agglomerated particles of a size of less than 6 um, 2 to 10% by weight of a suitable cement material, 0 to 8% by weight of thixotropic agent and 0 to 2% by weight of suitable deflocculants and plasticizers.

2. The refractory of claim 1, wherein said calcined ultrafine bauxite aggregate sized and ground substantially according to the following distribution:
3 to 6 mm—10 to 40%
1 to 3 mm—5 to 30%
0.1 to 1 mm—5 to 30%
<0.1 mm—10 to 40%

3. The refractory of claim 1, wherein said cement material is calcium aluminate cement which has an alumina content of about 40 to 85%.

4. The refractory of claim 1, wherein said thixotropic agents contain materials selected from microfine silica, and/or reactive alumina, and said deflocculants and plasticizers are selected from alkali phosphates, lignosulphonates or naphthalene sulphonates.

5. A method of making a low cement castable refractory comprising mixing together 85 to 96% by weight of a calcined ultrafine bauxite aggregate in which the ultrafine bauxite forming the aggregate comprises agglomerated particles having a size less than 6 um, 2 to 10% by weight of a suitable cement, 0 to 8% by weight of a thixotropic agent, and 0 to 2% by weight of suitable deflocculants and plasticizers.

6. A method of installing the low cement castable refractory of claim 5 by mixing the dry low cement castable refractory mix with 2 to 10% by weight of water followed by treatment to remove entrapped air, curing and heating to the refractory operating temperature.

7. The method of claim 5, wherein said ultrafine bauxite particles are agglomerated, dried to a moisture content of the order of 2 to 10%, recovered, crushed and screened into acicular chips of the desired granulometry and calcined at a temperature above 1350° C.

8. The method of claim 5, wherein said ultrafine bauxite aggregate is sized substantially according to the following distribution:
3 to 6 mm—10 to 40%
1 to 3 mm—5 to 30%
0.1 to 1 mm—5 to 30%
<0.1 mm—10 to 40%

* * * * *